Jan. 9, 1962 R. W. LANDAUER 3,016,492

STANDING WAVE PARAMETRIC AMPLIFIERS

Filed Dec. 23, 1959

INVENTOR
ROLF W. LANDAUER
BY John A. Hall
ATTORNEY

United States Patent Office 3,016,492
Patented Jan. 9, 1962

3,016,492
STANDING WAVE PARAMETRIC AMPLIFIERS
Rolf William Landauer, Poughkeepsie, N.Y., assignor to International Business Machines Corporation, New York, N.Y., a corporation of New York
Filed Dec. 23, 1959, Ser. No. 861,657
9 Claims. (Cl. 330—5)

This invention relates to electronic circuit components and particularly to devices intended to operate in the field of superhigh frequencies, otherwise known as the centimeter range, or where the circuit components have physical dimensions commensurate with the wavelength of the currents they will handle.

The object of the invention is to provide a circuit component which by its physical dimensions, shape and environment will possess electrical properties suitable for use in the field of superhigh frequencies and useful as components for devices such as high speed digital computers. It is particularly an object of the invention to provide an improved design of an element for amplifying a signal in the form of a burst of a given number of cycles of superhigh frequency current which enters the device of the present invention as a traveling wave, to store or hold the signal during the amplification thereof and to forward the signal thereafter when amplified.

It is an object of the invention to amplify the signal by parametric oscillation, that is, to apply to the signal a stimulus of double the frequency thereof and to subject the signal and the stimulus to a variable capacitance whereby as the voltage increases the rate of increase of the charge decreases, and conversely, as the voltage decreases the rate of decrease of the charge increases. Such an amplifier is known as a nonlinear-capacitance amplifier.

In accordance with the present invention such an amplifier is constructed of and made dependent on the shape and dimensions of a section of transmission line wherein the said transmission line is constructed of a pair of parallel conductors attached to and separated by ferroelectric material having non linear capacitance properties, or in which non linear properties may be developed by environment or circuit control means.

It is known that parametric oscillation is obtained by applying a stimulus of a frequency $2f$ to a circuit arrangement having a variable parameter reactor, that is including a capacitance, which varies with the voltage applied thereto.

The result, which is well known, has been explained by many esoteric discussions, as pumping (alluding to the classic analogy of the child's swing) and manifests itself as periodic contributions of energy by the stimulus in such phase relation to the signal that the signal even though minute at the start will be greatly amplified.

Thus a ferroelectric material is chosen or is modified by environment or other conditions which will change the capacitance in one direction as the voltage of the signal changes from a positive peak to a negative peak and will change the capacitance in the other direction as the voltage of the signal changes from a negative peak to a positive peak.

Thus, by the well known phenomenon of parametric oscillation a signal of a frequency $f$ when subjected to a stimulus of frequency $2f$, properly phase, will be amplified.

The present invention is embodied in amplifying means useful, by way of example, in a network wherein, parametric oscillations are received, developed, stored and transmitted by devices termed parametrons.

The device of the present invention consists of means similar to a parametron, in which a stimulus of a given frequency will produce a parametric oscillation, that is, one in which a variable parameter reactor will convert the result of the stimulus into an increasing effect. This result is obtained by limiting the size, shape and nature of the element to which the stimulus is applied in such a manner that the effect of the stimulus will be to bring the traveling incoming signal to a halt, to apparently convert it into a standing wave and to amplify it.

The initial signal, in the form of a traveling wave, may be considered as the sum of two standing waves, which are 90° out of phase in both time and space, and the operation here is to choose one of them and to amplify it by the effect of the stimulus. One of the two standing waves may be chosen by having it properly phased so as to gain maximum energy from the pumping signal, whereupon the other standing wave will then automatically be phased so as to give up its energy as quickly as possible. A standing wave is "properly phased" for maximum energy gain if the charge associated with it is large when the capacitance decrease caused by the pump signal is largest.

One of the two standing waves so chosen, will then grow, and the other will be attenuated. As it is attenuated, the original signal loses its traveling wave character (which depends on the simultaneous existence of two standing waves). Eventually the favored standing wave, which originally was just one of two parts present in a decomposition, will be the sole signal for all practical purposes.

A standing wave can be considered the sum of two traveling waves, moving in opposite directions. Thus, after the application of the stimulus is terminated, the exponentially increased standing wave will separate into two traveling waves which will thereupon move out along the transmission line in opposite directions. During the pumping process, that is, during the application of the stimulus, the growing standing wave, of course, can also be considered as a sum of two growing traveling waves. These, however, will not move apart as effectively as on an unpumped line, since the pumping process produces reflections which continually transform the traveling waves into each other. It is, in fact, just the continual transformation of a part of a first traveling wave into a reflected wave which is in phase with a second traveling wave which accounts for the exponential growth of the standing wave.

Thus, the incoming signal in the form of a traveling wave will appear to halt and remain at a single given location within the bounds set by the stimulus so long as the stimulus is maintained. However, when the stimulus is removed, these two equal and opposite waves being no longer restrained and held in step with each other will separate and travel in opposite directions, one in the direction of the original incoming traveling wave which was effectively halted and held at a given location along the transmission line, and the other in the opposite direction or in the direction in which the encounter with the stimulus had developed an equal and opposite traveling wave, the result of which was to develop a wave and a reflection thereof located at a given point along a transmission line. It will thus appear that the amplifier of the present invention consists of a means to apply a stimulus of double the frequency of the signal to be amplified to a section of transmission line which particular section is controlled by a variable parameter reactor, such as a transmission line having a ferroelectric dielectric. With such a stimulus of frequency $2f$ applied to this section of transmission line, the entering signal of frequency $f$ will be effectively halted and pumped, the stimulus contributing energy to amplify the effectively halted signal.

One important feature of the operation of the device is that it is capable of amplifying a range of frequencies. Thus, a stimulus of frequency $2f$ is capable of amplifying not only signals applied to the line at a frequency $f$ but also signals differing slightly from this frequency.

A feature of the invention is an arrangement whereby the stimulus may be applied to the section of the transmission line in such a manner that the rise and fall of the potential must be the same all along the line. The stimulus cannot be applied to one end of the section of transmission line and then allowed to travel from one end to the other thereof, but must be effectively and simultaneously applied to both ends and all intermediate points thereof. The pumping or the contributions of energy supplied by the stimulus must be the same all along the line. Thus, the incoming signal received by this special section of transmission line inserted in a circuit is effectively halted, then amplified and thereafter forwarded along the said circuit.

In accordance with a preferred embodiment of the present invention, the special section of transmission line constituting the amplifier is constructed in the form of an arc of a circle and the upper and lower electrodes thereof based on a slab of ferroelectric material having the desired non linear properties are effectively in contact with the perimeter of a circular segment of a conductor leading from the centerpoint whereat the stimulus is applied. With such an arrangement and by virture of the equal distances from this centerpoint to each and every conducting element of the perimeter thereof in contact with the said conductors of the section of transmission line, the stimulus thus delivered to the transmission line will at all times be the same along the said transmission line.

In accordance with another embodiment of this invention, the said section of transmission line may be fed from an oscillator or a plurality of oscillators over a plurality of connections each of exactly the same length or by some alternative arrangement whereby the stimulus as delivered to the said section of transmission line will be the same all along the line.

Other features will appear hereinafter.

The drawings consist of a single sheet having five figures, as follows.

Figures 4, 5:
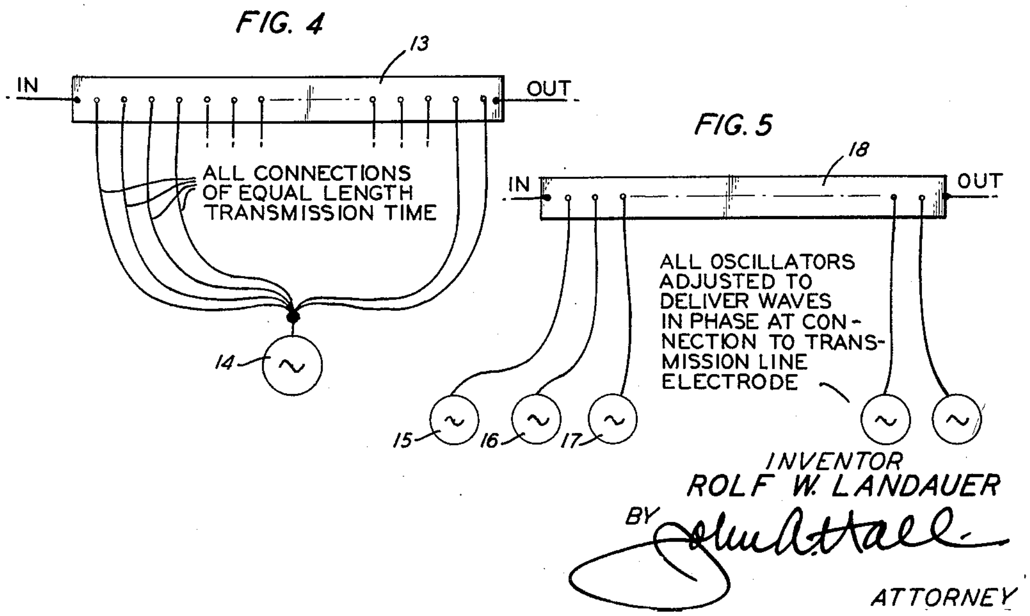

FIG. 4 is a diagrammatic representation of the manner in which the transmission line amplifier element may be constructed as a straight line device where in the oscillator providing the stimulus is connected to the electrode thereof by a plurality of connections each adjusted in length to provide equal transmission time, and FIG. 5 is a similar arrangement in which the stimulus is provided by a plurality of oscillators adjusted to deliver waves in phase at their connection to the transmission line electrode.

Figure 1:
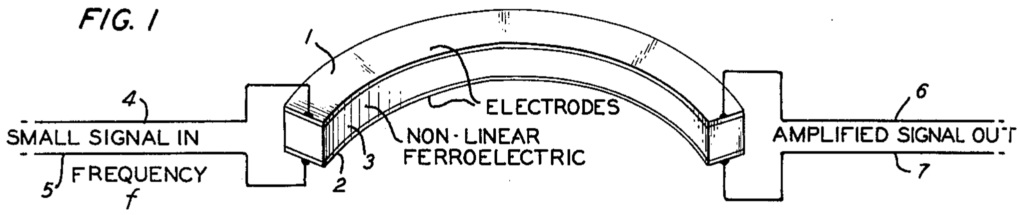
FIG. 1 is a diagrammatic representation of the circuit of a transmission line including a perspective view of the section of transmission line included therein and which constitutes the principal element of the amplifier.
Figure 2:
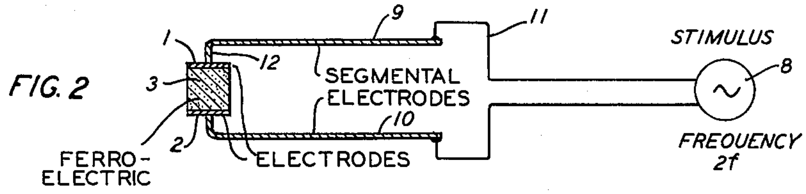
FIG. 2 is a cross sectional view of the section of transmission line and the segmental electrodes by which the stimulus is transmitted in equal times to all points along the longitudinal length of the amplifier.
Figure 3:
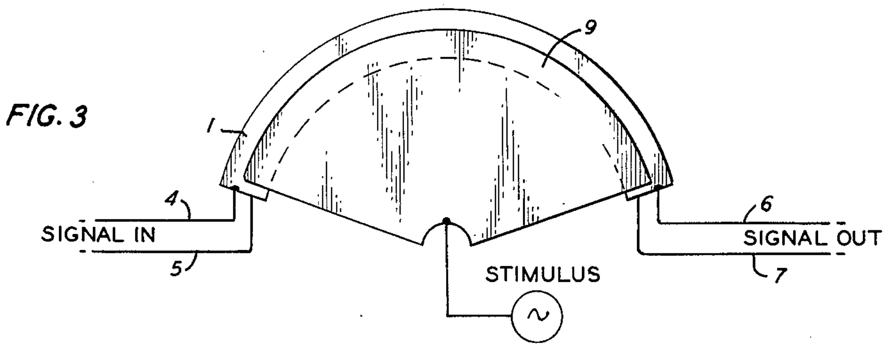
FIG. 3 is a plan view of the arrangement of the segmental electrodes in cooperative relationship with the amplifier element.

FIG. 1 is based on a perspective showing of an arcuate section of transmission line in which the electrodes 1 and 2 are in contact with and separated by a thin slab of ferroelectric material. The electrodes may be wires, ribbons of conducting material, or conducting material sprayed, painted or otherwise deposited on the ferroelectric crystal. The outstanding features of this device is its shape, the longitudinal axis of the electrodes 1 and 2 and the crystal 3 being an arc of a circle.

The small incoming signal applied to the in conductors 4 and 5 will travel over the electrodes 1 and 2 to the outgoing conductors 6 and 7 in the absence of what is herein termed a stimulus (the output of an oscillator having the frequency $2f$ where the frequency of the signal is $f$). If the stimulus can be applied to the electrodes 1 and 2 so as to be exactly in phase at all points along the longitudinal axis thereof, then the traveling incoming signal wave will be seemingly halted and converted into a standing wave. By building this section of transmission line on a slab of ferroelectric material having a non linear capacitance, what is known as a variable parameter reactor is introduced in the circuit with the result that the signal is subjected to parametric amplification.

In order to deliver the frequency $2f$ stimulus from an oscillator 8 in like phase to all points along the longitudinal axis of the electrodes 1 and 2, it is connected to conductors 9 and 10 each in the shape of the segment of a circle. Assuming the electrical properties of this fan shaped conductor to be uniform, it will be seen that the conductor 11 connected thereto will supply an infinity of paths to the turned down edge 12 thereof each of the same transmission time to corresponding points along the longitudinal axis of the conductor 1.

An alternative arrangement as shown in FIG. 4 is to fabricate the section of transmission line in the form of a straight line and to connect to the electrode 13 thereof at frequent intervals a connection to an oscillator 14. An arrangement of this nature requires that each connection between the oscillator 14 and the electrode 13 be the same so there will be no difference in the transmission time thereover. Additionally, the length of electrode between the connections made thereto must be so small that no significant transmission time will be involved.

Still another alternative arrangement is one shown in FIG. 5 where a plurality of oscillators 15, 16, 17, and so on, are employed and these are finely adjusted to deliver their outputs to the electrode 18 exactly in phase.

With such a parametric amplifier, a signal in the shape of a burst of a given number of cycles of alternating current may be transmitted over the input conductors and when this is properly centered along this section of transmission line, the stimulus of double the frequency thereof is connected to the device. The traveling wave constituting the signal is effectively halted and converted to a standing wave which is then amplified by parametric oscillation. When the stimulus is terminated, this standing wave effectively separates into two traveling waves which are not transmitted in opposite directions, one over the output wires and the other backwards over the input wires.

Ferroelectric material exhibits the nonlinear reactance required of such a device, one such material being triglycine sulfate. For the technical description of this material reference is made to page 490 of the Merck Index, seventh edition, published by Merck & Co., Inc., Rahway, N.J. Further description of the characteristics of this material is found in an article by S. Triebwasser which appeared in the IBM Journal, vol. 2, No. 3, July, 1958, pages 212–217. Further, the non linearity of the capacitance is very pronounced near the Curie temperature for these materials and for this reason it is preferred that the device using a ferroelectric dielectric be maintained at a temperature near the Curie temperature for the dielectric. It is also preferable that the device be operated around the knee of its characteristic charge-voltage curve and for this reason, direct current biasing is employed. This bias is supplied, for example, by a D.C. voltage applied between the electrodes 1 and 2 of the transmission line as shown in FIG. 1.

It should also be understood that the principles of this invention are not restricted to transmission lines employing ferroelectrics as nonlinear dielectrics, such as those shown and described herein by way of illustration but, rather, the principles may be applied in fabricating parametric amplifiers using transmission lines of different types exhibiting a nonlinear reactance which is simultaneously varied all along the line in the same way.

What is claimed is:

1. Amplifying means consisting of a section of special transmission line included within a conventional transmission line and comprising electrodes secured to and separated by ferroelectric material having a nonlinear characteristic, means to apply to said electrodes evenly along the longitudinal axis thereof a stimulus, and a source of a stimulus having a frequency $2f$ where a signal transmitted over said line and into said section of special transmission line has a frequency $f$.

2. Amplifying means consisting of a section of special transmission line included within a conventional transmission line and consisting of electrodes secured to and separated by dielectric material comprising a variable parametric reactor, means to apply a stimulus to said electrodes along the longitudinal axis thereof, a source of a stimulus having a frequency $2f$ where a signal transmitted over said transmission line and into said section of special transmission line has a frequency $f$, said means for applying said stimulus consisting of transmitting means connected between said source of stimulus and the longitudinal axis of said electrodes having equal transmission times.

3. Amplifying means consisting of a section of special transmission line included in circuit within a conventional transmission line and consisting of electrodes secured to and separated by dielectric material comprising a variable parametric reactor, a source of a stimulus having a frequency of $2f$ where a signal transmitted over said transmission line and into said section of special transmission line has a frequency $f$, means to apply a stimulus from said source simultaneously to all points along the longitudinal axis of said electrodes, said means for applying said stimulus consisting of a plurality of equal transmission time conducting channels connected in between said source of stimulus and the said electrodes along the longitudinal axis thereof.

4. Amplifying means consisting of a section of special transmission line included in circuit within a conventional transmission line and consisting of electrodes secured to and separated by dielectric material comprising a variable parametric reactor, a source of a stimulus having a frequency of $2f$ where a signal transmitted over said transmission line and into said section of special transmission line has a frequency $f$, means to apply a stimulus from said source simultaneously to all points along the longigitudinal axis of said electrodes, said means for applying said stimulus consisting of a plurality of equal transmission time conductors connected in between said source of stimulus and the said electrodes along the longitudinal axis thereof at intervals each having a practically insignificant transmission time value.

5. Amplifying means consisting of a section of special transmission line included in circuit within a conventional transmission line and consisting of electrodes secured to and separated by dielectric material comprising a variable parametric reactor, a source of a stimulus having a frequency of $2f$ where a signal transmitted over said transmission line and into said section of special transmission line has a frequency $f$, means to apply a stimulus from said source simultaneously to all points along the longitudinal axis of said electrodes, said means for applying said stimulus consisting of a pair of conductors shaped as the segment of a circle to transmit said stimulus from the geometric center point thereof along the radii thereof to the circular arc perimeter thereof, said perimeter being in cooperative relationship with the longitudinal axis of each said electrode.

6. Amplifying means consisting of a section of special transmission line included in circuit within a conventional transmission line and consisting of electrodes secured to and separated by dielectric material comprising a variable parametric reactor, a source of a stimulus having a frequency of $2f$ where a signal transmitted over said transmission line and into said section of special transmission line has a frequency $f$, means to apply a stimulus from said source simultaneously to all points along the longitudinal axis of said electrodes, said means for applying said stimulus consisting of a plurality of equal transmission time conducting channels connected in between said source of stimulus and the said electrodes along the longitudinal axis thereof, said section of transmission line being shaped in such manner that the said longitudinal axis of each said electrode comprises a geometrically circular perimeter.

7. Amplifying means consisting of a section of special transmission line included in circuit within a conventional transmission line and consisting of electrodes secured to and separated by dielectric material comprising a variable parametric reactor, a source of a stimulus having a frequency of $2f$ where a signal transmitted over said transmission line and into said section of special transmission line has a frequency $f$, means to apply a stimulus from said source simultaneously to all points along the longitudinal axis of said electrodes, said means for applying said stimulus consisting of a fan shaped segment of a circular conducting element for connecting said source of stimulus to the said electrodes along the said longitudinal axis thereof, said section of special transmission line being shaped in such manner that the longitudinal axis of said electrodes comprises a section of the perimeter of a circle.

8. Amplifying means consisting of a section of special transmission line included in circuit within a conventional transmission line and consisting of electrodes secured to and separated by dielectric material comprising a variable parametric reactor, a source of a stimulus having a frequency of $2f$ where a signal transmitted over said transmission line and into said section of special transmission line has a frequency of $f$, said source consisting of a plurality of oscillators, means to apply a stimulus from said source simultaneously in phase at all points along the longitudinal axis of said electrodes, said means for applying said stimulus consisting of a plurality of conducting channels connected in between said oscillators and said points along the longitudinal axis of said electrodes, and means for adjusting the phase of each said oscillator to produce the said like phase relationship at all points along said longitudinal axis.

9. A parametric amplifier circuit comprising a transmission line having a nonlinear reactance, means for applying to said line an input signal at a frequency substantially equal to a frequency $f$, means for applying a pumping signal at a frequency $2f$ to said line, said pumping signal being applied simultaneously to a continuous section of said line and effective to successively increase the reactance simultaneously all along said section and then decrease the reactance simultaneously all along said section, whereby said input signal is amplified.

References Cited in the file of this patent

UNITED STATES PATENTS 2,815,488 Von Neumann ----------- Dec. 3, 1957

OTHER REFERENCES

Tien et al.: "Proceedings of the IRE," April 1958, pages 700–706.

Kroll: "IBM Technical Disclosure Bulletin," vol. 2, No. 2, August 1959, pages 55–57.